No. 880,415. PATENTED FEB. 25, 1908.
F. C. STEVENS.
PULLEY SUSTAINING HANGER.
APPLICATION FILED OCT. 14, 1907.
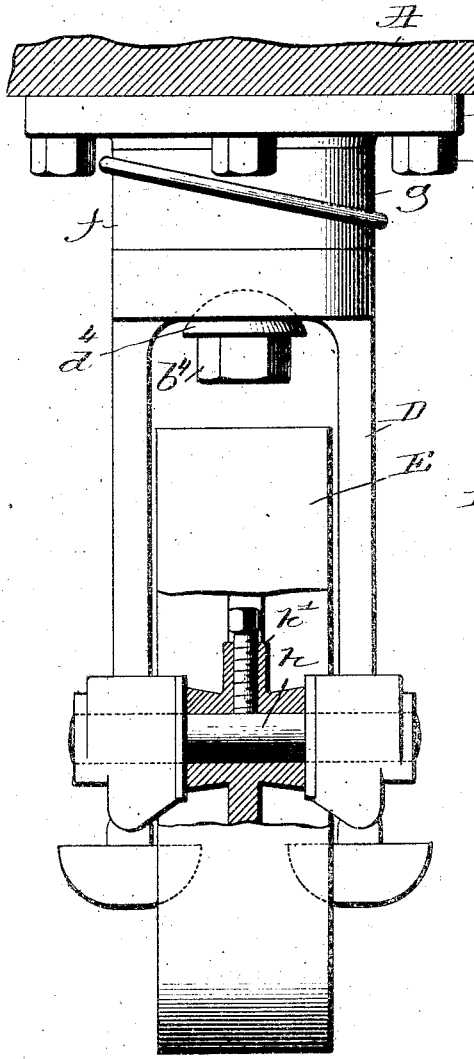
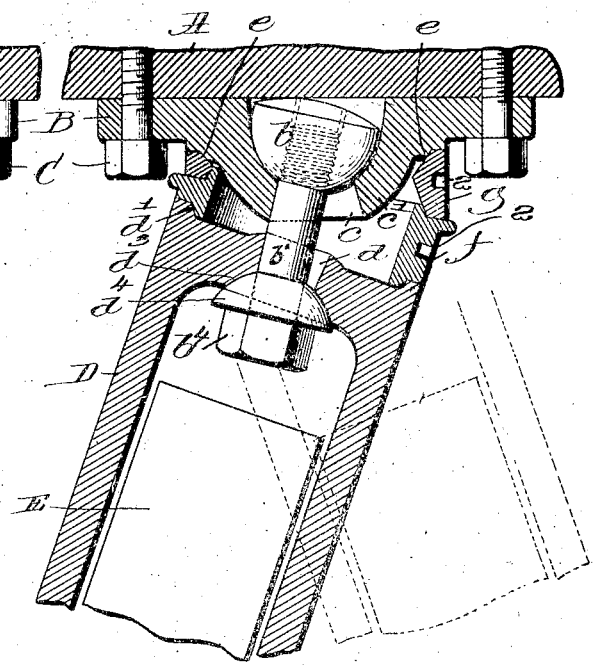
Witnesses:
Fred. S. Greenleaf.
Thomas J. Drummond.
Inventor.
Frank C. Stevens,
By Crosby & Gregory,
Attys.

UNITED STATES PATENT OFFICE.

FRANK C. STEVENS, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

PULLEY-SUSTAINING HANGER.

No. 880,415.　　　　Specification of Letters Patent.　　　　Patented Feb. 25, 1908.

Application filed October 14, 1907. Serial No. 397,248.

*To all whom it may concern:*

Be it known that I, FRANK C. STEVENS, a citizen of the United States, and resident of North Andover, county of Essex, State of Massachusetts, have invented an Improvement in Pulley-Sustaining Hangers, of which the following description, in connection with the accompanying drawing, is a specification, like letters on the drawing representing like parts.

In setting up machinery in factories it is frequently necessary for the millwright to locate a pulley at an angle to another pulley and that this may be done and the pulley be sustained firmly in its desired position I have made the hanger to be herein described and claimed.

Figure 1 shows my novel hanger in a proper position, the face of the pulley standing in a horizontal plane, and Fig. 2 is a sectional detail showing how the hanger may be adjusted to occupy an inclined position.

In the drawing A represents let it be supposed part of a mill ceiling, and B a socket plate secured thereto by suitable bolts or lag screws C. The socket plate has a concavity or socket provided with a central opening $c$, and the under side of the socket plate is made convexed or partially hemi-spherical as at $c'$. The concavity of the socket plate sustains the under side of a semi-spherical nut $b$ of a bolt, the shank $b'$ of the bolt being preferably threaded thereinto, see dotted lines Fig. 2 said bolt extending through the opening $c$ and also through an opening $d$ in the upper end of the hanger D forked as usual to receive between its legs a pulley E.

The exterior or top of the hanger is circular in shape and presents a circular rib or track $d'$ beveled at one side, while the under side of the top part of the hanger is shown as having a concavity $d^3$ surrounding the opening $d$, said concavity receiving the convexed top side of a semi-spherical washer $d^4$ which is sustained by the head $b^4$ of the bolt. The underside of the socket plate B outside its semi-spherical portion is also provided with a track $e$.

Between the tracks $d'$ and $e$, I interpose means for changing the angle of the hanger with relation to a perpendicular line, said means in the plan in which I have herein chosen to illustrate my invention in one of its best forms, comprising two rings $f, g$, varying in width, *i. e.* each ring being wider parallel to its center at some points than at other points, as shown in the drawings.

The lower end of ring $f$ is shaped to fit the interior of the circular track $d'$ and also to rest on the upper side thereof. The upper end of the upper ring is shaped to fit the track $e$, and the abutting ends of the two rings are so shaped that one ring can be turned on the other and their working connection be maintained. Each ring will be so constructed that when the bolt is loosened, either or both rings may be turned more or less, as for instance, said rings may have spanner holes 2, or their equivalent studs, that may be readily engaged. Before turning the rings which constitute hanger tipping means to place the hanger in any diagonal position, the bolt $b'$ will be loosened so that it may swing and adjust itself to the position required for the hanger, and then the bolt is set up tight to lock the hanger in its angular position.

The headed bolt is extended through the hanger and tipping means, and said bolt, its nut $b$, and washer $d^4$ constitute universally adjustable connections between the hanger and the socket plate to enable the hanger to be adjusted to any desired angle by moving the hanger tipping means, the bolt having a ball and socket connection with both the hanger and the socket plate. The hanger receives a pulley shaft $h$ to which may be secured in any usual manner as by a bolt $h'$ the belt pulley.

Having fully described my invention, what I claim as new and desire to secure by Letters Patent is:—

1. A plate having a semi-spherical socket and provided with a circular track, a hanger having a circular track at its end adjacent the plate, two rings interposed between the tracks, the rings varying in width and contacting one with the other, a bolt having a semi-spherical portion seated in the socket of the plate, and a ball and socket connection between the bolt and the hanger.

2. A plate having a semi-spherical exterior and provided with a track, a hanger having at its upper end a circular track, and two rings interposed between said hanger and track, said rings varying in width and contacting one with the other, and a bolt entering said hanger and having a semi-spherical portion seated in said plate, said bolt being provided with a second hemi-spherical portion inside said hanger.

In testimony whereof, I have signed my name to this specification, in the presence of two subscribing witnesses.

FRANK C. STEVENS.

Witnesses:
 WALTER T. PUTNAM,
 WILLIAM D. RUNDLETT.